UNITED STATES PATENT OFFICE.

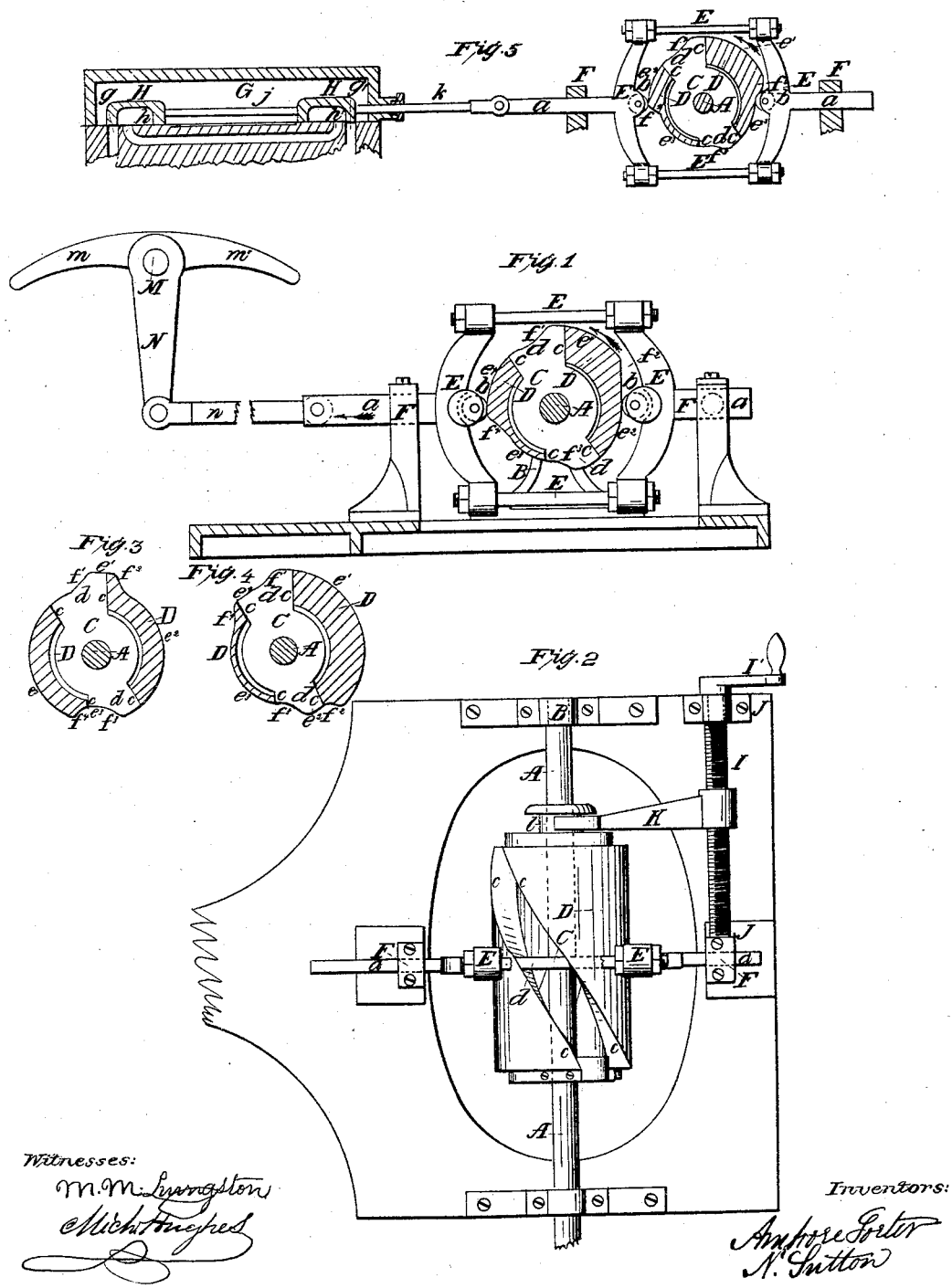

AMBROSE FOSTER AND NOAH SUTTON, OF NEW YORK, N. Y.

VARIABLE-CUT-OFF GEAR FOR STEAM-ENGINES.

Specification of Letters Patent No. 24,801, dated July 19, 1859.

*To all whom it may concern:*

Be it known that we, AMBROSE FOSTER and NOAH SUTTON, both of the city, county, and State of New York, have invented a new and useful Improvement in Variable-Cut-Off Gears for Steam and other Motive Engines; and we do hereby declare that the following is a full, clear, and exact description of the same, reference being had to the accompanying drawings, making part of this specification, in which—

Figure 1, exhibits a vertical section of a cut off gear with our improvement adapted to a puppet valve steam engine. Fig. 2, is a plan of the same. Figs. 3 and 4, exhibit the sectional form of the cam near the two ends. Fig. 5, is a side view explaining the modification necessary to adapt it to a slide valve engine.

Similar letters of reference indicate corresponding parts in the several figures.

Our invention consists principally in the employment for operating either the main valve or valves of an engine or a separate cut-off valve or valves, of a compound cam of novel construction applied either upon the main shaft of the engine or upon a counter shaft and serving to effect the cutting off of the steam at various points in the stroke of the piston either under the control of a governor or of any contrivance at the command of the engineer.

To enable others skilled in the art to make and use our invention we will proceed to describe its construction and operation.

A, (Figs. 1, 2 3 and 4) is the shaft which carries the compound cam and which may be supposed to be either the main shaft of the steam engine or a counter shaft deriving motion therefrom at the same velocity. B, B, are the bearings in which the said shaft is supported.

C, and D, are the two parts of the compound cam of which the part C, is keyed or otherwise secured in a fixed position on the shaft and the part D, is fitted to slide on the shaft, but prevented turning thereon by a feather and groove.

E, is a yoke within which the cam acts to operate the valves having two straight stems $a$, $a$, fitted to slide in fixed guides F, F, and having an anti-friction roller $b$, at each end for the cam to act upon to give it the necessary reciprocating motion.

The part C, of the cam whose form is best represented in Fig. 1, need not have its face of greater width than the faces of the anti-friction rollers $b$, $b$, as it is never shifted in the direction of the length of the shaft; but the part D, must be of considerable width, say about equal to twice its diameter; and the latter contains two spiral grooves $c$, $c$, extending nearly or quite from end to end to receive the two wings $d$, $d$, of the part C, which fits within the said grooves, and so cause the part C, to carry the part D, around with it in the revolution of the shaft. The said part D, which consists of a mere shell, may be made in two or more pieces, in order to get the part C, inside of it. The perimeter or face of this cam C D, is composed of four arc formed portions $e'$, $e^2$, $e^3$, $e^4$, all concentric with the shaft A, and four intervening steps $f'$, $f^2$, $f^3$, $f^4$, the steps $f'$, $f^3$, being on the part C, and the steps $f^2$, $f^4$, on the part D, and the arc formed portions being partly on the part C, and partly on the part D, as shown in Figs. 1, 3, and 4. The face is in all parts parallel with the axis of the shaft A, but the length of the several arc formed portions $e'$, $e^2$, $e^3$, $e^4$, taken in a circumferential direction varies from one end of the cam to the other, owing to each of the said arc formed portions terminating in one direction in one edge of one of the spiral grooves and in the other direction in the steps, which run parallel with the shaft. This variation in the length of the arcs, is illustrated by Figs. 1, 3 and 4, of which Fig. 1, represents a section at the middle of the cam; Fig. 3, a section near the end which is at the bottom of Fig. 2; and Fig. 4, a section near the end which is at the top of Fig. 2.

In each of the Figs. 1, 3 and 4, the part C, of the cam is supposed to be close to the plane of section. By shifting the part D, along the shaft, different parts of it are made to unite with the part C, to operate upon the yoke to give it an intermittent reciprocating motion, and though, owing to the several steps of the cam being of the same height from end to end of the cam, the throw or distance of movement of the yoke never varies, the length of time the yoke remains stationary at each end of the stroke will be greater or less as the part D, of the cam presents longer or shorter portions of the arcs $e'$, $e^3$, within the yoke.

I, (Fig. 2) is a screw having journals at its ends fitted to turn in stationary bearings J, J, but prevented moving longitudinally, said screw being parallel with the shaft A.

K, is a forked arm having its fork fitted to a groove $l$, in a boss formed on one end of the part D, of the cam and having at the opposite end to the fork an internally screwed socket which fits the threads of the screw I. The screw I, is furnished with a handle I', to enable it to be turned by the engineer for the purpose of causing the arm K, to travel along it and thus shifting the part D, of the cam C D, along the shaft A.

To illustrate the application and operation of the compound cam in combination with a puppet valve engine we have represented in red color in Fig. 1, an end view of the rock shaft M, for working the two stem valves, the said shaft having two toes $m$, $m'$, set opposite ways in a well known manner, one for lifting each valve, and an arm N, with which the yoke is connected by a rod $n$, for the purpose of giving the necessary motion to the said shaft. The several portions of the face of the cam perform the following functions in the operation of the valves. The step $f'$, by its action on the two rollers $b$, $b$, alternately, produces the movement necessary to raise the valves from their seats to effect the induction for each stroke of the engine; the two opposite arcs $e'$, and $e^3$, which have a corresponding length in a circumferential direction keep the valve open till the steam is to be cut off; the step $f^4$, acts upon the rollers $b$, $b$, to cut off the steam and the arcs $e^2$, and $e^4$, which are both struck with the same radius allow the valves to remain closed from the time the steam is cut off till the stroke of the piston is terminated. The steps $f^2$, and $f^3$, are made to permit the operations of $f'$, and $f^4$, and allow both rollers to follow the face of the cam. The part C, of the cam is so set on the shaft that the step $f'$, always commences operation on one or other roller just as the stroke of the engine piston terminates.

The cam rotates in the direction of the arrow shown upon it in Fig. 1. The position there represented is that after the steps $f^4$, $f^2$, have just passed the rollers, and the former has just acted on the left hand roller $b$, and shifted the yoke in the direction of the arrow shown upon it in Fig. 1, to the position in which the arm N, is vertical, and the two toes have positions precisely the reverse of each other; and no further movement of the rockshaft or valves will take place till the step $f'$, comes into action on the aforesaid (left hand) roller $b$, and gives the yoke a further movement in the same direction to raise the toe $m$, and so lift its respective valve and effect the induction of steam; and while the arcs $e^3$, $e^4$, pass between the rollers the said valve will remain open; but when the step $f^4$, comes into operation on the right hand roller, it will move the yoke in the opposite direction to the arrow marked on it far enough to permit the return of the rock shaft and toes to the position shown in Fig. 1, thus allowing the valves to close and cut off steam, and in this condition the yoke and rock shaft will remain till the step $f'$, comes into operation on the right hand roller and moves the yoke still farther in the same direction and so raises the toe $m'$, and lifts its respective valve; and in this way the operation proceeds, the step $f$, first moving the arm N, as one stroke of the piston takes place in one direction from the position shown in the drawing then back again and during the return stroke moving the arm first in the opposite direction from the represented position and back again, thus giving to one toe the necessary movement to open and close its respective valve during one stroke of the engine and to the other toe necessary movement to open its respective valve during the return stroke, the steam being admitted through a greater or less portion of the stroke of the piston according to the position of the part D, of the cam relatively to the part C, and to the length of the shaft.

The compound cam may be constructed to give any required amount of variation in the point of cutting off the steam to use it expansively during the remainder of the stroke of the piston, by making the spiral grooves $c$, $c$, of a suitable pitch so as to give the desired variation in the length of the arc in a circumferential direction.

The cam and yoke for operating slide valves represented in Fig. 5, are like those shown in Figs. 1, 2, 3 and 4, in every respect but that the arc $e^2$, of the cam instead of having a precisely similar radius to the arc $e^4$, has a larger radius, the object of which will be presently explained.

G, Fig. 5, is the valve chest furnished with two short slide valves H, H', of a well known kind; $j$, is the stem of the said valves connected by a rod $k$, with the cam yoke E.

$g$, $g'$, are the steam ports and $h$, $h'$, the exhaust ports. The several steps and arcs of the cam in Fig. 5, perform the same functions as the corresponding parts of the cam applied to the slide valve, but to prevent either steam port $g$, or $g'$, being closed to the exhaust ports as soon as the steam is cut off from the opposite one the arc $e^2$, is left fuller than $e^4$, and by that means when the steam is cut off from one, the opposite one is left a little way open as shown in Fig. 5, where steam is shown as being cut off from $g$, but $g'$, remains a little way open to the exhaust. A proper construction of the slide valves, it will be understood by engineers, will also be necessary in connection with this construction of the cam. The same construction of the cam is applicable in connection with a single slide valve and three ports.

In applying the compound cam to work a separate cut-off independently of the main valve or valves it may be constructed as shown in Figs. 1, 2, 3 and 4 and the yoke and all its appendages may have the same construction as represented in the several figures. Its connection with the cut-off must be such as to open and close it during the movement of the yoke in either direction.

When the compound cam is applied in combination with a governor the part D, is connected with the governor in such a manner that by the action of the latter it may be moved in one or the other direction along the shaft, to cut off steam sooner or later in the stroke of the engine as may be required to regulate the speed.

What we claim as our invention and desire to secure by Letters Patent is—

The employment for operating either the main valve or valves of an engine or a separate cut-off valve or valves, of a compound cam composed of two parts C, and D, constructed and combined with each other and applied to the main or a counter shaft substantially as herein described.

AMBROSE FOSTER.
N. SUTTON.

Witnesses:
   Mich. Hughes,
   M. M. Livingston.